Patented Mar. 2, 1943

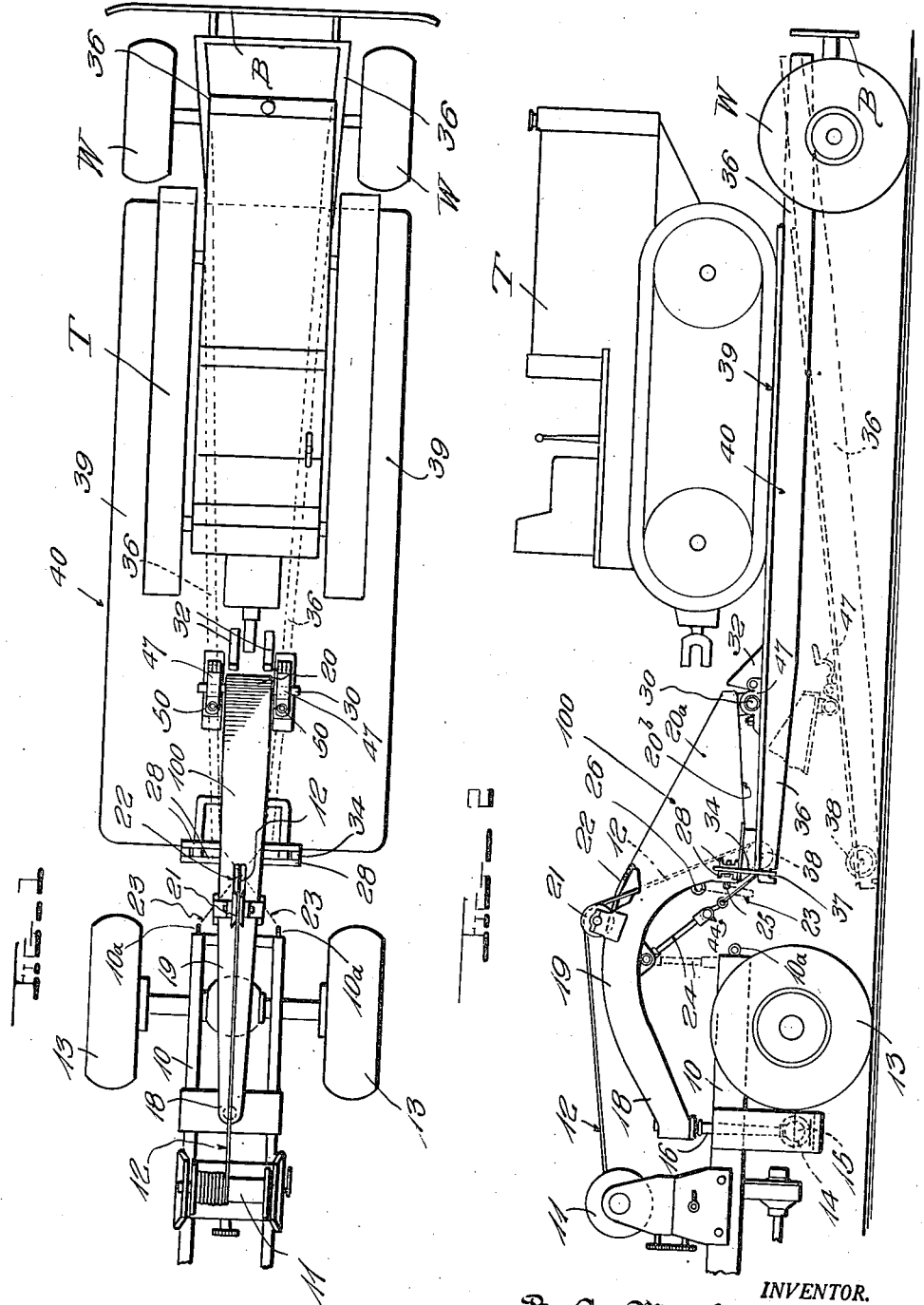

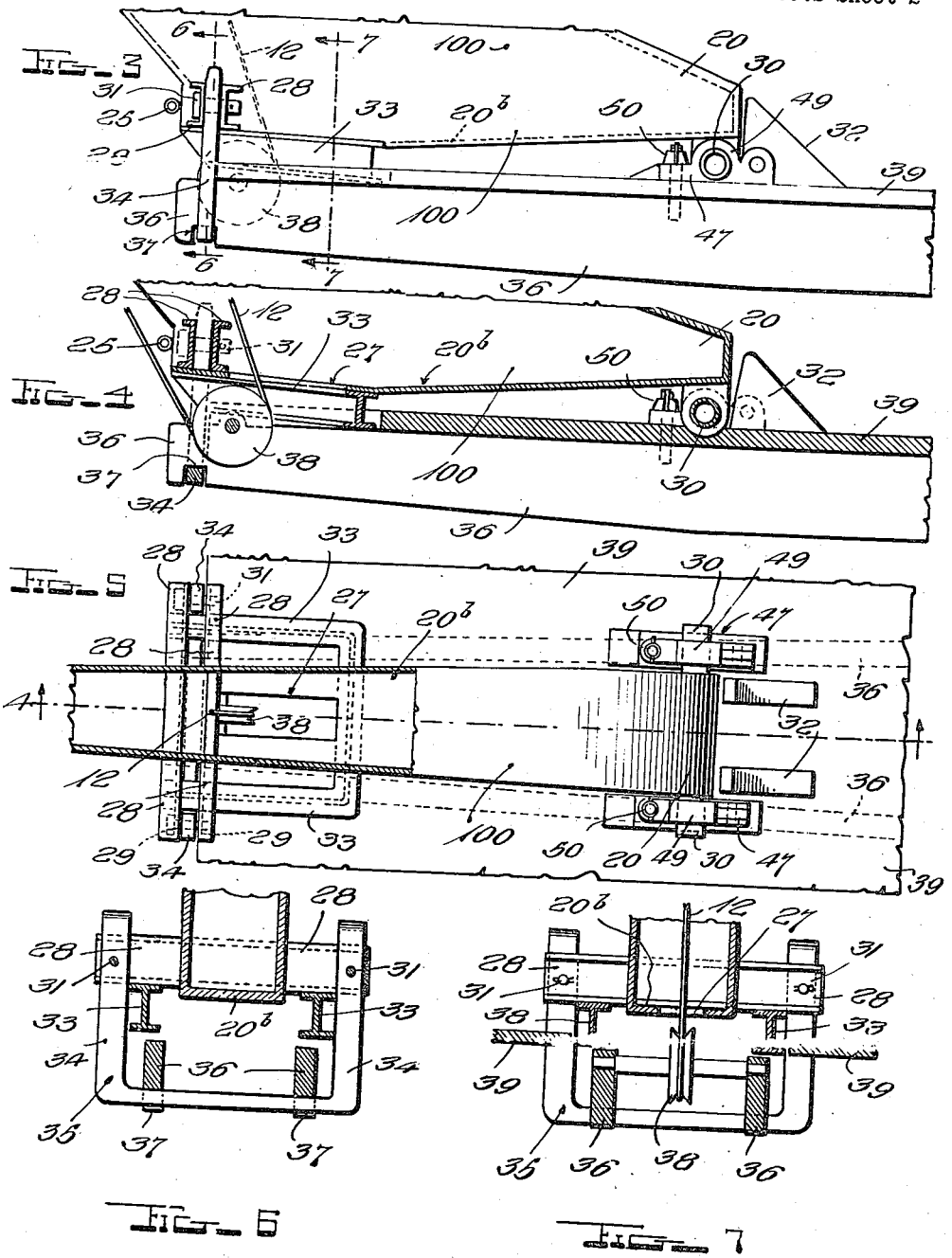

2,312,769

UNITED STATES PATENT OFFICE 2,312,769

TRAILER AND COUPLING THEREFOR

Bernhard A. Mosling, Oshkosh, Wis.

Application April 23, 1941, Serial No. 389,996

13 Claims. (Cl. 214—86)

My invention relates to trailers and couplings therefor and has particular reference to trailers for transporting a broken down vehicle to a repair shop and to means for coupling the trailer to a tractor, said coupling means being an improvement on the coupling disclosed in my co-pending application, Serial No. 344,797, filed July 10, 1940.

With the foregoing in view, an object of my invention is to provide an improved tractor-trailer coupling over that disclosed in my co-pending application aforesaid.

A further object is to provide novel combinations of tractor carried coupling means and complementary trailer carried coupling means.

A further object is to provide novel means for rigidly connecting the free end of a swingable crane of a tractor to a trailer having a tongue and a trail or like portion which is normally positioned to provide a ramp for loading said trailer.

A further object is to provide a novel trailer for transporting a load, comprising a flat, load supporting portion having one end unsupported and wheels supporting the opposite end.

A further object is to provide a trailer such as that last described which includes tractor coupling means on the load supporting surface of said unsupported end.

A further object is to provide a novel trailer for transporting a load which includes a flat, load supporting floor which is unsupported at one end and which is wheeled at the other end, which includes coupling means on said unsupported end and bumper means on the wheeled end extending rearwardly beyond said wheels.

Other objects and advantages reside in the particular structure of my device, combination and arrangement thereof and of the several parts thereof, and in the particular mode of utilizing the same,—all of which will be readily apparent to those skilled in the art upon reference to the drawings and specification wherein the invention is shown, described and claimed.

In the drawings:

Fig. 1 is a plan view of tractor, trailer and coupling, the tractor being but partially shown;

Fig. 2 is an elevation of Fig. 1, but showing the trailer in both the coupled and the uncoupled position;

Fig. 3 is an enlarged fragmentary elevation of the coupling showing the same coupled;

Fig. 4 is a longitudinal vertical section of the coupling taken on the plane of the line 4—4 of Fig. 5;

Fig. 5 is an enlarged fragmentary plan view, partly in horizontal section, of the coupling showing the same coupled;

Fig. 6 is a transverse vertical section through the coupling taken on the plane of the line 6—6 of Fig. 3; and Fig. 7 is a view like Fig. 6, but taken on the plane of the line 7—7 of Fig. 3.

Referring specifically to the drawings, wherein like reference characters have been used throughout to designate like parts, 10 designates the frame of any suitable tractor member. A drum 11 is mounted on the tractor and has a cable 12 attached thereto. Any suitable source of power may be utilized to actuate the cable drum 11— such as a connection (not shown) between the drum and the tractor motor. A socket member 14 is mounted low down in the central portion of the frame 10 forwardly of the rear wheels 13 and seated in said socket 14 is the ball end 15 of an upright member 16. Any suitable means retains the ball end 15 in the socket member 14 for universal movement therein. The upper end of the upright 16 is rigidly connected to an end 18 of a crane or gooseneck 100 which includes an upwardly directed humped portion 19 and a depending free end 20. A sheave 21 is suitably mounted in the humped portion 19 of the crane and an aperture 22 is formed through the upper surface of the crane just rearwardly of the sheave 21 to permit the passage of the cable 12 therethrough.

As a matter of practice, it has been found to be desirable to terminate the cable 12 short of the sheave 21 and provide a length of cable which is detachably securable to the free end of the cable 12 and which thereafter passes over the sheave and through the gooseneck 100. This arrangement simply saves time as it is frequently necessary for the cable 12 to be used apart from the gooseneck and the alternative arrangement just described makes it unnecessary to thread the free end of the cable through the gooseneck thereafter.

A substantially U-shaped brace member 24 is swingably connected in any suitable manner to the underside of the humped part 19 of the gooseneck with its bight portion swinging free. The member 24 may be retained in an inoperative position along the underside of the crane 100 by suitable clips or the like (not shown) but, for the most part is maintained in its inoperative position by being engaged by the hook 44 of the cable 12. When the brace member is to be used as such it is detached from its clips or from the hook 44 and swung to the broken line position of Fig. 2, where it engages the upper surface of the frame 10. Suitable clips, such as those shown in my co-pending application aforesaid may be carried by the frame to lock the brace 24 in its bracing position.

The rear end of the frame 10 is provided with an eye 10a at either side thereof which receive hooks on the free ends of crossed chains 23. The other ends of the chains 23 are fixed as at 25 to the lower near corners of the free end 20 of the crane 100. The crane may provide also eyes 26 in which the free ends of the chains 23 may be hooked when they are disengaged from the tractor frame 10.

The purpose of the brace member 24 and the chains 23 is to prevent "whipping" of the crane or gooseneck 100 when it is not attached to a trailer. The chains obviously prevent movement by the crane in a horizontal plane and the brace member 24 prevents movement in a vertical plane. Both the chains 23 and the brace 24 are disengaged when the tractor is hitched to a trailer to give the hitch full flexibility for turns and passage over rough ground.

The free end 20 of the crane or gooseneck is formed to provide a dovetailed top and bottom as well as flared sides. The sides of the end 20 are spanned at the extreme free end of the underside by a bar 30 the free ends of which extend outwardly beyond the sides of the crane. The floor 20b of the crane end 20 is provided with a hole 27 for the passage of the cable 12 therethrough. The floor 20b also supports a pair of U-beam or channel members 28 which extend transversely of the crane in spaced back-to-back arrangement with their free ends extending outwardly of the sides of the crane. Aligned openings 29 extend through the webs of the free ends of the members 28 and receive pins 31 therein for a purpose to be described later.

The trailer 40 comprises a rectangular floor 39 which is supported by at least a pair of longitudinally extending and rearwardly diverging beams 36 which extend beyond the floor at both the front and the rear ends thereof. The ends of the beams 36 which extend beyond the front of the floor 39 are provided with transversely aligned notches 37 on their undersides. The rear extensions of the beams 36 mount a pair of wheels W which are protected at the rear by a frame-carried bumper B. The front end of the floor 39 between beams 36 is recessed to provide clearance for a sheave 38 which is mounted in suitable bearings which may be formed on the forwardly extending ends of the beams 36. It is to be understood that cable engaging reverting means other than sheave 38 may be employed. Clearance between the underside of the crane end 20 and the sheave 38 is provided by a pair of spaced I-beam members 33 carried by the underside of the crane end. Obviously, if desired the I-beams 33 could be omitted and the sheave 38 set lower to make it unnecessary to provide such clearance.

The floor 39 rearwardly of the sheave 38 is provided with a pair of spaced clamp members 47 which include swingable closure members 49 and securing means or nuts 50. Just inside the clamp members 47 and slightly rearwardly thereof are a pair of laterally spaced abutments or crane stops 32.

The crane is hitched to the trailer in the following manner. Assuming that the trailer is disengaged and with its front end resting on the ground as in Fig. 2, the brace 24 and chains 23 are disengaged and the gooseneck or crane is lowered until it will engage the abutments or stops 32 when the tractor is backed toward the trailer. Once such engagement has been achieved, perfect alignment of the parts is unnecessary, the cable 12 is passed around the sheave 38 and hooked to the bight of the brace member 24 as shown in Fig. 2. The drum 11 is now rotated and the crane and trailer are forced or pulled into perfect alignment with the stop or stops 32 as a fulcrum. The swingable closure members 49 of the clamps 47 are now swung over the free ends of the cross bar 30 and secured by the cap screws 50. A U-shaped member 35 is now attached to the front end of the crane with its legs 34 upright and its bight in the notches 37 of the extended front ends of the trailer frame beams 36. The upper ends of the legs 34 of the U-shaped member 35 are passed between the U-beam members 28 and have holes therein adapted to be aligned with holes 29 through which pass the pins 31 whereby to connect member 35 to the cross beams 28 of the crane and complete the rigid connection between crane and trailer. Tractor and trailer are now connected together for transport. While the crane end 20 is rigidly connected to the trailer, the opposite end of the crane is universally connected to the tractor to provide full flexibility for turns and travel over rough terrain.

The structure of the trailer 40 is peculiarly advantageous for the loading and transport of heavy vehicles such as tractors, tanks or the like. In the drawing a tractor T has been shown in position on the trailer 40. From a military point of view the trailer 40 is particularly valuable inasmuch as the breaking down of a tank may mean the loss of the same to the enemy as repairs can rarely be made in situ if the breakdown occurs at an advanced point. My trailer will enable many such damaged tanks to be salvaged. This is done by positioning the trailer with its front end close to the disabled vehicle and, of course, lowered and disengaged from the tractor. The tractor is now brought around to the rear of the trailer and into engagement with the bumper B. The cable 12 is now hitched to the disabled tank or the like and the drum 11 rotated to drag the tank up onto the platform 39. The cable 12 is now disengaged, the tractor returns to the front of the trailer and the hitch is accomplished as previously described. The fact that no special ramps are necessary, and that the trailer is low slung are all features making for ease in loading heavy vehicles onto the trailer as the incline is but slight and the crippled vehicle must be dragged but a short distance to completely load it. By pulling the tank up onto the trailer, the engagement of the bumper with the tractor braces the trailer and virtually slides it under the tank.

Obviously the trailer 40 need not be used solely for salvage purposes but provides an excellent means for the rapid transportation of slow moving forms of tanks, tractors and the like. The tractor may be used to haul field pieces, heavier artillery or trailers other than that herein disclosed in the manner disclosed in my co-pending application aforesaid. In such instances it is understood that the trailers, etc. will be provided with hitching means corresponding to that of the trailer 40.

While I have shown and described what is now thought to be the preferred embodiment of my invention, it is to be understood that the same is susceptible of other forms and expressions. Consequently, I do not limit myself to the precise form shown and described except as hereinafter claimed.

I claim:

1. A coupling for a tractor and a trailer comprising a boom universally connected at one end to said tractor, a topping lift cable for said boom, an actuating winding drum for said cable, connecting means for detachably connecting an end of said cable to said boom, a cable-reverting means permanently and rigidly carried by said trailer and adapted to have an operative engagement with a bight of said cable, tractor carried means engageable by cable end connecting means whereby to effect preliminary coupling of said boom and trailer, and additional means for thereafter rigidly coupling said boom and trailer together.

2. A coupling for a tractor and a trailer comprising a boom universally connected at one end to said tractor, a topping lift cable for said boom, an actuating tractor-carried winding drum for said cable, a cable-reverting means permanently and rigidly carried by said trailer and adapted to have an operative engagement with a bight of said cable, tractor carried means coupled to the free end of said cable, and the trailer having fulcrum-providing abutment means engaging the outer end of the boom when the cable is wound onto said drum whereby the trailer is rocked to hauling position.

3. A coupling for a tractor and trailer, comprising a boom universally connected at one end to said tractor and having its free end extending rearwardly of said tractor, complementary coupling means on said boom and trailer for pivotally coupling them together on a transverse horizontal axis, tractor-carried means moving said boom and trailer on said pivotal coupling to raise said boom and trailer to a hauling position, means for thereafter rigidly connecting said boom and trailer together, said last named means comprising a substantially U-shaped link, means connecting said link to said boom, and means for detachably connecting the bight of said link to said trailer.

4. A coupling for a tractor and a trailer, comprising a boom universally connected at one end to said tractor and having its free end extending rearwardly of said tractor, complementary coupling means on said free end of said boom and said trailer for pivotally coupling them together in a transverse horizontal axis, means moving said boom and trailer on said pivot to bring said boom and trailer to a hauling position, means for rigidly locking said boom and trailer in said position, said last named means comprising a substantially U-shaped link, an extension on one end of said trailer, a notch in the under surface of said extension adapted to receive the bight of said link, and means for rigidly connecting the legs of said link to said boom.

5. A coupling for a tractor and a trailer, comprising a boom universally connected at one end to said tractor and having its free end extending rearwardly of said tractor, complementary coupling means on said free end of said boom and said trailer for pivotally coupling them together on a transverse horizontal axis, means moving said boom and trailer on said pivot to bring said boom and trailer to a hauling position, means for rigidly locking said boom and trailer in said position, said last named means comprising a substantially U-shaped link, an extension on one end of said trailer, a notch in the under surface of said extension adapted to receive the bight of said link, substantially vertically disposed slots formed in said boom and adapted to receive the legs of said link therein, and means for locking said legs in said slots.

6. A coupling for a tractor and a trailer, comprising a boom universally connected at one end to said tractor, a topping lift cable for said boom, a drum for said cable and means for actuating the same, means for detachably connecting an end of said cable to said boom, a cable-reverting means on said trailer and adapted to have an operative engagement with a bight of said cable to effect a preliminary coupling of said boom and trailer, means for thereafter rigidly coupling said boom and trailer together, said preliminary coupling comprising a transverse, horizontal pivotal coupling in longitudinal spaced relation to said cable-reverting means, said cable being adapted to thereafter be actuated to move said boom and trailer relatively on said pivotal coupling to a hauling position, and means for rigidly locking said boom and trailer together in said hauling position.

7. A coupling for a tractor and a trailer, comprising a boom universally connected at one end to said tractor, a topping lift cable for said boom, a drum for said cable and means for actuating the same, means for detachably connecting an end of said cable to said boom, a cable-reverting means on said trailer and adapted to have an operative engagement with a bight of said cable to effect a preliminary coupling of said boom and trailer together, said preliminary coupling comprising a transverse, horizontal pivotal coupling in longitudinally spaced relation to said cable-reverting means, said cable being adapted to thereafter be actuated to move said boom and trailer relatively on said pivotal coupling to a hauling position, and a link adapted to rigidly lock said boom and trailer in said hauling position.

8. A coupling for a tractor and a trailer, comprising a boom universally connected at one end to said tractor, a topping lift cable for said boom, a drum for said cable and means for actuating the same, means for detachably connecting an end of said cable to said boom, a cable-reverting means on said trailer and adapted to have an operative engagement with a bight of said cable to effect a preliminary coupling of said boom and trailer, means for thereafter rigidly coupling said boom and trailer together, said preliminary coupling comprising a transverse, horizontal pivotal coupling in longitudinal spaced relation to said cable-reverting means, said cable being adapted to thereafter be actuated to move said boom and trailer relatively on said pivotal coupling to a hauling position, a substantially U-shaped link, an extension on one end of said trailer, a notch in the under surface of said extension adapted to receive the bight of said link, and means for detachably and rigidly connecting the legs of said link to said boom.

9. In a truck and trailer coupling, a boom extending rearwardly from the tractor, means rigidly locking said boom and trailer together in hauling position and comprising a substantially U-shaped link, an extension on one end of said trailer, a notch in the under surface of said extension adapted to receive the bight of said link, substantially vertically disposed slots formed in said boom and adapted to receive the legs of said link therein, and means for locking said legs in said slots.

10. The structure of claim 8, said means for connecting the legs of said link to said beam including laterally spaced vertical slots in said boom receiving said legs, and means for locking said legs in said slots.

11. The structure of claim 3, said means for connecting said link to said boom comprising a pair of laterally spaced vertical slots in said boom receiving the legs of said link and means for locking said legs in said slots.

12. The structure of claim 8, said means for connecting the legs of said link to said boom comprising a pair of U-beams extending transversely across the end of said boom and outwardly of either side thereof, said beams being arranged in spaced back-to-back relation to provide laterally spaced vertical slots outwardly of each side of said boom, said slots receiving said legs of said link therein, and means for locking said legs in said slots.

13. The structure of claim 5, laterally extending beam members extending transversely across said boom and outwardly of the sides thereof, said beam members being horizontally spaced to provide said slots.

BERNHARD A. MOSLING.